Dec. 29, 1953     J. H. WINTERRINGER     2,664,256
LUBRICATING SYSTEM FOR THE PERIPHERY OF
TIRES ON LANDING GEARS FOR AIRPLANES
Filed Sept. 12, 1950
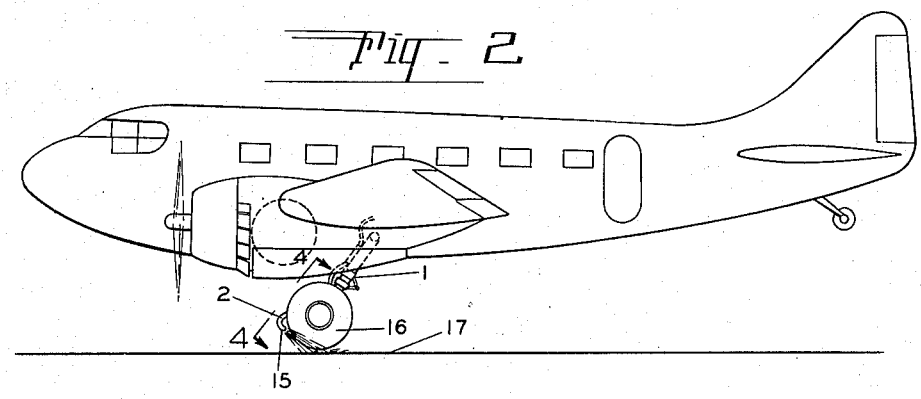
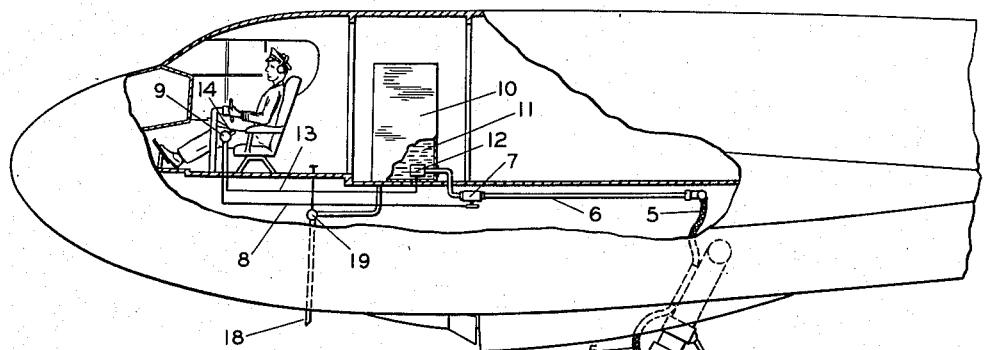
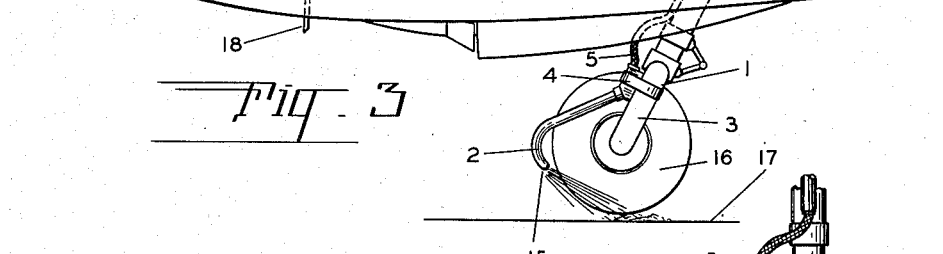
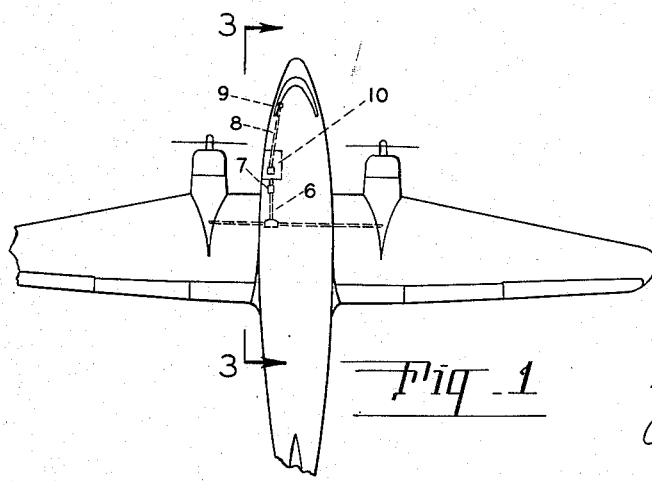
*INVENTOR.*
JOHN H. WINTERRINGER
BY
ATTORNEY Patented Dec. 29, 1953

2,664,256

UNITED STATES PATENT OFFICE 2,664,256

LUBRICATING SYSTEM FOR THE PERIPHERY OF TIRES ON LANDING GEARS FOR AIRPLANES

John H. Winterringer, Yakima, Wash.

Application September 12, 1950, Serial No. 184,468

3 Claims. (Cl. 244—103)

My invention relates to improvement in lubricating system for the periphery of tires on landing gears for airplanes, and the primary object of the same is to reduce the frictional drag of the wheels of the landing gear on contacting the runway.

In the landing of airplanes, the landing wheels are relatively at a standstill when contacting the runway. Considerable friction is developed between the tires and the runway, but with my invention this friction is reduced by applying lubrication to the periphery of the tire and to the runway at the point of contact. This material may be either a liquid or powder, depending upon which is best suited.

A still further object of the invention is to provide a means of applying this lubricant under the control of the pilot and independent of the power system of the airplane.

These and other incidental objects will be apparent in the drawings, specification and claims.

Referring to the drawings:

Figure 1 is a partial plan view of a conventional type airplane incorporating my new and improved apparatus for applying a lubricant to the landing gear.

Figure 2 is a side view of an airplane, having my new and improved device for applying a lubricant to the peripheries of the tires and runway at the point of contact.

Figure 3 is an enlarged view of Figure 2, taken on line 3—3 of Figure 1, partially broken away for convenience of illustration.

Figure 4 is a front view of the landing gear, having my lubricant applicator applied thereto. This view is taken on line 4—4 of Figure 2.

Referring more specifically to the drawings:

In the drawings I illustrate the landing gear assembly 1 in lowered or landing position. My invention consists of applying a spray nozzle 2 to the landing gear by any suitable means, as for instance the same may be clamped to the wheel bracket 3 by the clamp 4. The lubricant is delivered to the nozzle by way of the flexible tubing 5 from a supply line 6.

The supply line 6 has a shut off valve 7 to be operated by the pilot by way of the control rod 8 from a control station 9. A supply tank 10 located within the fuselage supplying a lubricant 11 to the supply line 6 to the valve 7, either by gravity or by the booster pump 12. The said booster pump is of well known practice within airplane gasoline tanks. This pump is controlled by the pilot from the control station 9 through the control line 13, which may be either mechanical or electrical.

In the operation of my new and improved lubricating device for airplane landing gears, the pilot operates a control lever 14 at the control station 9 which will open the valve 7, permitting the lubricant to flow through the line 6, flexible tubing 5 and out the tip 15 of the nozzle 2 against the periphery of the landing wheels 16 and on to the runway surface 17. This lubricant will reduce the friction and shock imparted to the wheels while contacting the landing surface, reducing tire wear and harmful shocks to the airplane.

I have not attempted to show anything in regards to the supply of lubricant or controls in detail, as the operation of my invention is the principle of applying a lubricant, either in a liquid or powder to the wheels and to the runway while making landings, thereby as stated above, reducing friction and shock. It is desirable to have a mechanism that will operate independent of the power of the airplane, as for instance in forced landings and the like.

This lubricant can be either applied by gravity or by a booster pump, as it requires little force to apply the same due to the fact that the plane is travelling at a high rate of speed and when a lubricant leaves the nozzle tip 15, the wind velocity thoroughly sprays the same over the periphery of the tire and on the landing surface.

I have illustrated in the drawings a second discharge nozzle 18, controlled by the valve 19, which could be used for discharging the lubricant from the tank 10 in the event it was desired to lighten the load of the plane or for spraying purposes, although this is not the object of my invention, it is one application that could be incorporated relative to the supply tank 10.

Although certain specific embodiments of the invention have been shown and described, it is obvious that many modifications thereof are possible.

What I claim is:

1. In a lubricating system for the peripheries of tires on landing gears for airplanes, the combination with the airplane and landing gears adapted to be raised or lowered, a nozzle clamped to each landing gear at one side thereof and extending downwardly and rearwardly in front of the periphery of the tire tread to spray a lubricant against the periphery of the tire and a runway at the point of contact of the tire with runway and onto the latter, a lubricant supply the runway and onto the latter, a lubricant supply tank in the airplane, a discharge line from the tank to the nozzle including a flexible section attached to the nozzle where the latter is connected to the landing gear allowing raising and lowering of the landing gear while maintaining connection with the nozzle, a control valve in the line, and means in the airplane for controlling said valve.

2. A lubricating system as defined in claim 1, wherein a booster pump is provided for forcing the lubricant from the tank to the line, and means in the airplane controlling the operation of said booster pump.

3. A lubricating system as defined in claim 2, wherein the means for controlling the valve and the means for controlling the operation of the booster pump are located adjacent the airplane control means for operation by the pilot of the airplane, and an additional valve controlled discharge for the lubricant from the tank.

JOHN H. WINTERRINGER.

References Cited in the file of this patent

UNITED STATES PATENTS

| Number | Name | Date |
|---|---|---|
| 2,138,030 | Giovannoli | Nov. 29, 1938 |
| 2,386,301 | Duke | Oct. 9, 1945 |
| 2,466,150 | Burt | Apr. 5, 1949 |

FOREIGN PATENTS

| Number | Country | Date |
|---|---|---|
| 18,301 | Great Britain | of 1906 |
| 379,153 | France | Sept. 2, 1907 |
| 522,018 | France | Mar. 18, 1921 |
| 997,480 | France | Sept. 12, 1951 |